US012094670B2

(12) United States Patent
Nelson, II et al.

(10) Patent No.: US 12,094,670 B2
(45) Date of Patent: Sep. 17, 2024

(54) SNAP TOGETHER ASSEMBLY FOR VACUUM INTERRUPTER DRIVE ROD

(71) Applicant: S&C Electric Company, Chicago, IL (US)

(72) Inventors: Sigurd A. Nelson, II, Glencoe, IL (US); Keith W. Benson, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 182 days.

(21) Appl. No.: 18/075,865

(22) Filed: Dec. 6, 2022

(65) Prior Publication Data

US 2023/0268152 A1 Aug. 24, 2023

Related U.S. Application Data

(60) Provisional application No. 63/312,783, filed on Feb. 22, 2022.

(51) Int. Cl.
*H01H 33/666* (2006.01)

(52) U.S. Cl.
CPC ... *H01H 33/666* (2013.01); *H01H 2033/6667* (2013.01)

(58) Field of Classification Search
CPC ............. H01H 33/666; H01H 33/6662; H01H 33/6606; H01H 2033/6667; H01H 1/5866
USPC ................ 218/140, 120, 121, 141, 153, 154
See application file for complete search history.

(56) References Cited

U.S. PATENT DOCUMENTS

| | | | | | |
|---|---|---|---|---|---|
| 3,597,713 | A * | 8/1971 | McClain | H01H 73/38 | 361/115 |
| 4,124,790 | A * | 11/1978 | Kumbera | H01H 33/666 | 218/138 |
| 5,808,258 | A * | 9/1998 | Luzzi | H01H 33/66207 | 218/138 |
| 6,198,062 | B1 * | 3/2001 | Mather | H01H 33/022 | 218/120 |
| 6,927,356 | B2 * | 8/2005 | Sato | H01H 33/666 | 218/120 |
| 7,115,831 | B2 * | 10/2006 | Chyla | H01H 33/6606 | 218/124 |
| 7,829,814 | B2 * | 11/2010 | Marchand | H01H 33/6661 | 218/140 |
| 8,952,826 | B2 * | 2/2015 | Leccia | H01H 33/6662 | 218/123 |
| 2002/0179571 | A1 * | 12/2002 | Rhein | H01H 33/6662 | 218/7 |
| 2009/0218319 | A1 * | 9/2009 | Kagawa | H01H 1/5822 | 218/140 |
| 2016/0005560 | A1 * | 1/2016 | Ache | H01H 33/66207 | 335/151 |

(Continued)

*Primary Examiner* — William A Bolton

(57) ABSTRACT

A switch assembly including a vacuum interrupter having a fixed contact and a movable contact, an actuator operable to move the movable contact, and a drive rod assembly coupled to the movable contact and the actuator. The drive rod assembly includes a male part and a female part where the male part is inserted into and coupled to the female part. One of the male part or the female part includes a conductor that provides an electrical connection between the male and female parts and one of the male part or the female part includes a locking ring that snap fits into a groove in the other male or female part.

17 Claims, 2 Drawing Sheets

(56) References Cited

U.S. PATENT DOCUMENTS

| | | | | |
|---|---|---|---|---|
| 2017/0236663 A1* | 8/2017 | Jung | .................... | H01H 33/666<br>218/140 |
| 2020/0176204 A1* | 6/2020 | Delpozzo | ............. | H01H 33/666 |

* cited by examiner

SNAP TOGETHER ASSEMBLY FOR VACUUM INTERRUPTER DRIVE ROD

CROSS-REFERENCE TO RELATED APPLICATION

This application claims the benefit of priority from the U.S. Provisional Application No. 63/312,783, filed on Feb. 22, 2022, the disclosure of which is hereby expressly incorporated herein by reference for all purposes.

BACKGROUND

Field

This disclosure relates generally to a snap together assembly for a drive rod coupling a vacuum interrupter to an actuator and, more particularly, to a snap together assembly for a drive rod coupling a vacuum interrupter to an actuator, where the snap together assembly includes a current conductor and a locking ring.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders. three-phase and single phase lateral lines are tapped off of the feeder that provide the medium voltage to various distribution transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Power distribution networks of the type referred to above typically include switching devices, breakers, reclosers, interrupters, etc. that control the flow of power throughout the network. Fault interrupters, for example, single-phase self-powered magnetically actuated reclosers that employ vacuum interrupters and magnetic actuators coupled together by a drive rod, are often provided on utility poles and in underground circuits along a power line prevent power flow downstream of the recloser. These reclosers typically detect the current and/or voltage on the line to monitor current flow and have controls that indicate problems with the network circuit, such as detecting a high current fault event. If such a high fault current is detected the recloser is opened in response thereto, and then after a short delay closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open, where the time between detection tests may increase after each test. For a typical reclosing operation for fault detection tests, about 3-6 cycles or 50 to 100 ms of fault current pass through the recloser before it is opened, but testing on delayed curves can allow fault current to flow for much longer times.

A vacuum interrupter is a switch that employs opposing contacts, one fixed and one movable, positioned within a vacuum enclosure. When the vacuum interrupter is opened by moving the movable contact away from the fixed contact to prevent current flow through the interrupter a plasma arc is created between the contacts that is quickly extinguished in the vacuum when the AC system current goes through zero. The gap between the separated contacts in vacuum provide dielectric strength that exceeds power system voltage and prevents current flow. The vacuum interrupter housing supports the contact structures and is an insulator, typically ceramic, to provide dielectric strength.

The magnetic actuator used in these types of switching devices typically have an armature or plunger that is moved by an electrical winding wound on a stator to open and close the vacuum interrupter contacts, where the plunger and the stator provide a magnetic path for the magnetic flux produced by the winding, and where the plunger is rigidly fixed to the movable contact by a drive rod. In one design, when the actuator is controlled to close the vacuum interrupter, the winding is energized by current flow in one direction, which causes the plunger to move and seat against a latching plate.

When magnetically actuated reclosers of the type discussed above are assembled, the drive rod is secured to the actuator and then the actuator and driver rod assembly is rotated to be threaded into the vacuum interrupter, where the amount of threading sets the gap between the fixed contact and the movable contact. However, during assembly the connection point between the drive rod and the vacuum interrupter is relatively inaccessible because it is deep within the assembly housing. This connection point is along the main current path of the recloser, so the point between the drive rod and the vacuum interrupter must be capable of carrying the same current levels as the overall device. Furthermore, this connection point between the drive rod and the vacuum interrupter has to transmit mechanical forces for operating the moving contact, which requires the connection to be very stiff, have very little or no lost motion, and transmit forces on the order of a few hundred pounds. Additionally, the connection point between the drive rod and the vacuum interrupter has to be assembled without placing torque on the vacuum interrupter bellows, which is a leading cause of vacuum interrupter damage during assembly.

SUMMARY

The following discussion discloses and describes a switch assembly including a vacuum interrupter having a fixed contact and a movable contact, an actuator operable to move the movable contact, and a drive rod assembly coupled to the movable contact and the actuator. The drive rod assembly includes a male part and a female part where the male part is inserted into and coupled to the female part. One of the male part or the female part includes a conductor that provides an electrical connection between the male and female parts and one of the male part or the female part includes a locking ring that snap fits into a groove in the other male or female part.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a snap together assembly for a drive rod coupling a vacuum interrupter to an actuator, where the snap together assembly includes a current conductor and a locking ring, is merely exemplary in nature, and is in no way intended to limit the disclosure or its applications or uses.

Figure 1:
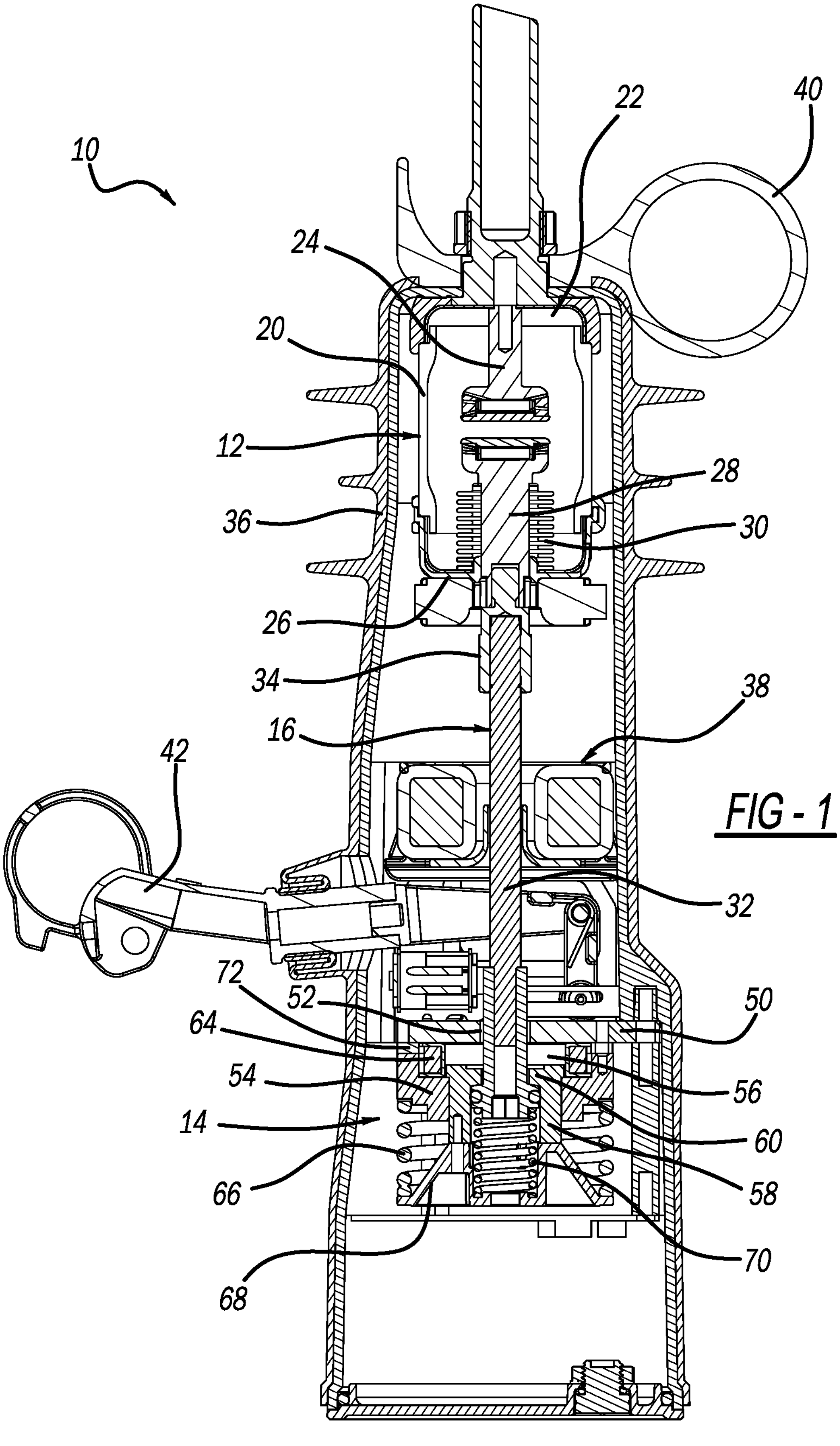
FIG. 1 is a cross-sectional view of a magnetically actuated switch assembly including a vacuum interrupter, a magnetic actuator and a snap-fit drive rod therebetween.

FIG. 1 is a cross-sectional type view of a magnetically actuated switch assembly 10 of the type discussed above, where the switch assembly 10 has particular application for use in a single-phase self-powered magnetically actuated fault interrupting device for use in a medium voltage power distribution network. The assembly 10 includes an outer housing 36 and a vacuum interrupter 12 coupled to a magnetic actuator 14 that opens and closes the vacuum interrupter 12 by actuating a drive rod 16, where the drive rod 16 includes a male part 32 and a female part 34 discussed in detail below. The vacuum interrupter 12 includes a cylindrical ceramic insulator 20, a fixed end cap 22 coupled to one end of the insulator 20 out of which a fixed contact 24 extends and a moving end cap 26 coupled to the other end of the insulator 20 out of which a movable contact 28 extends, where a bellows 30 maintains the vacuum within the vacuum interrupter 12 when the movable contact 28 moves. A current harvesting transformer 38 is shown wrapped around the male part 32. A pull ring 40 is coupled to a top portion of the assembly 10 and helps for pushing in and pulling out the assembly 10 to and from a cut-out. A current carrying trunnion 42 is coupled to the assembly 10 and is configured to engage the cut-out.

The actuator 14 includes an annular latching plate 50 having a central opening 52 through which the male part 32 of the rod 16 extends. The actuator 14 also includes a stator 54 defining a central opening 56, where a magnetic plunger 58 having a top shoulder 60 is slidably positioned within the opening 58. A coil 64 is positioned against the stator 54 in the opening 56 and a series of permanent magnets 72 are positioned between the plate 50 and the stator 54. An opening spring 66 is positioned between a base member 68 and the stator 54 and a compliance spring 70 is provided within the base member 68. When the vacuum interrupter 12 is to be closed, the coil 64 is energized with current flow in one direction, which draws the plunger 59 and the base member 68 upward against the bias of the opening spring 66 and the compliance spring 70. The current to the coil 64 is turned off, and the permanent magnets 72 hold the plunger 58 in the closed position. When the vacuum interrupter 12 is to be opened, the coil 64 is energized in the opposite direction, which forces the plunger 58 down and breaks the magnetic hold of the permanent magnets 72. The opening spring 66 and the compliance spring 70 provide the force to open the contacts 24 and 28 against the welding force on the contacts 24 and 28.

Figure 2:
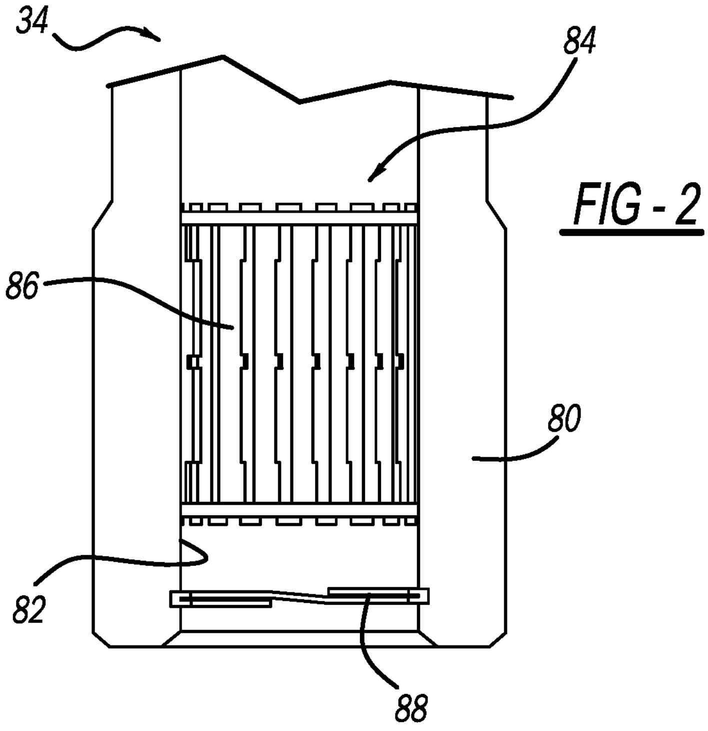
FIG. 2 is a broken-away cross-sectional view of a female part of the snap-fit drive rod.
Figure 3:
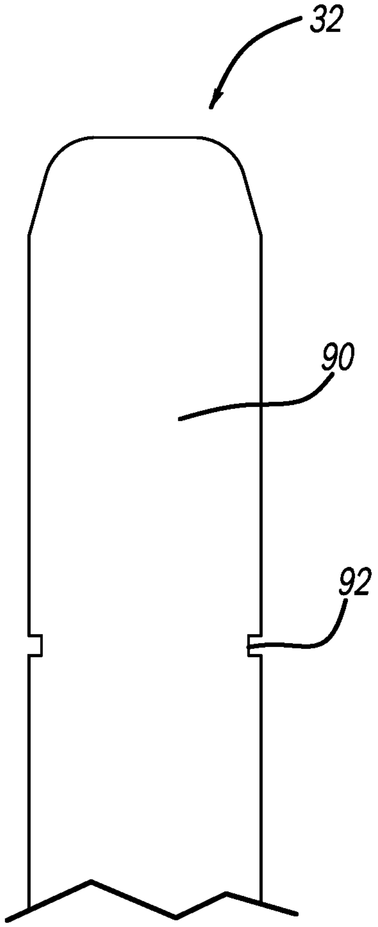
FIG. 3 is a broken-away cross-sectional view of a male part of the snap-fit drive rod.

FIG. 2 is a broken-away cross-sectional view of the female part 34 of the drive rod 16 and FIG. 3 is a broken-away cross-sectional view of the male part 32 of the drive rod 16. As discussed above, the connection point between the parts 32 and 34 must withstand the mechanical shock force when the actuator 14 breaks the weld between the contacts 24 and 28 and must carry fault current. The female part 34 includes a cylindrical portion 80 defining an inner chamber 82. A cylindrical current conductor 84 is provided within the chamber 82 and formed into the cylindrical portion 80. In this design, the conductor 84 includes a series of spaced multilam contacts 86. However, the conductor 84 can be configured in other ways within the scope of the disclosure. The conductor 84 is made of a flexible conductive material, such as copper, so that when the male part 32 is inserted into the chamber 82, the conductor 84 forms to the male part 32 to provide a good electrical connection. A locking ring 88 made of a hard metal, such as steel, capable of withstanding the shock force is positioned within a groove in the cylindrical portion 80 within the chamber 82. The male part 32 includes a cylindrical tip portion 90 that is sized to fit with the chamber 82 and make electrical contact with the conductor 84. The tip portion 90 includes a locking groove 92 that is sized to accept the locking ring 88 in a snap-fit engagement.

In the embodiment discussed above, the conductor 84 and the locking ring 88 are formed to the female part 34. However, in other embodiments, the conductor and the locking ring can be formed to the male part 32 or the conductor can be formed to the male part 32 and the locking ring can be formed to the female part 34 or the conductor can be formed to the female part 34 and the locking ring can be formed to the male part 32.

Figure 4:
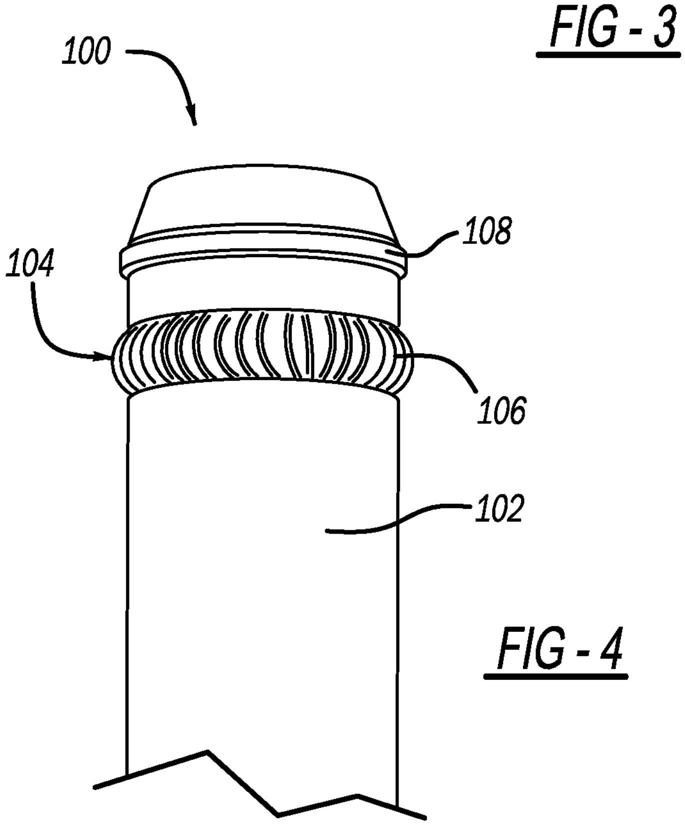
FIG. 4 is a broken-away cross-sectional view of another version of a male part for the snap-fit drive rod.

FIG. 4 is a broken away cross-sectional view of a male part 100 showing another embodiment. The male part 100 includes a cylindrical shaft 102. A flexible conductor 104 including conductive elements 106 is formed to the shaft 102 and a locking ring 108 is formed to the shaft 102. The female part would include the necessary locking groove.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A switch assembly comprising:

a vacuum interrupter including a fixed contact and a movable contact;

an actuator being operable to move the movable contact; and a drive rod assembly coupled to the movable contact and the actuator, the drive rod assembly including a male part and a female part where the male part is inserted into and coupled to the female part, wherein one of the male part or the female part includes a conductor that provides an electrical connection between the male and female parts and one of the male part or the female part includes a locking ring that snap fits into a groove in the other male part or female part.

2. The switch assembly according to claim 1 wherein the female part is coupled to the movable contact and the male part is coupled to the actuator.

3. The switch assembly according to claim 1 wherein the female part includes both the conductor and the locking ring.

4. The switch assembly according to claim 1 wherein the male part includes both the conductor and the locking ring.

5. The switch assembly according to claim 1 wherein the female part includes the conductor and the male part includes the locking ring.

6. The switch assembly according to claim 1 wherein the male part includes the conductor and the female part includes the locking ring.

7. The switch assembly according to claim 1 wherein the conductor is a cylinder conductor formed to a wall in a bore of the female part.

8. The switch assembly according to claim 7 wherein the cylinder conductor includes spaced apart multilam contacts.

9. The switch assembly according to claim 1 wherein the actuator is a magnetic actuator.

10. The switch assembly according to claim 9 wherein the switch assembly is part of a single-phase self-powered magnetically actuated fault interrupting device for use in a medium voltage power distribution network.

11. A switch assembly comprising:

a vacuum interrupter including a fixed contact and a movable contact;

an actuator being operable to move the movable contact; and a drive rod assembly including a male part coupled to the actuator and a female part coupled to the vacuum interrupter where the male part is inserted into and coupled to the female part, the female part including a cylindrical bore, a cylindrical conductor formed in the bore and a locking ring formed in the bore and the male part including a locking groove so that the locking ring seats in the locking groove and the conductor makes electrical contact with the male part.

12. The switch assembly according to claim 11 wherein the cylinder conductor includes spaced apart multilam contacts.

13. The switch assembly according to claim 11 wherein the actuator is a magnetic actuator.

14. The switch assembly according to claim 13 wherein the switch assembly is part of a single-phase self-powered magnetically actuated fault interrupting device for use in a medium voltage power distribution network.

15. A switch assembly comprising:

a vacuum interrupter including a fixed contact and a movable contact;

an actuator being operable to move the movable contact; and a drive rod assembly including a male part coupled to the actuator and a female part coupled to the vacuum interrupter where the male part is inserted into and coupled to the female part, the male part including a shaft, a conductor formed to the shaft and a locking ring formed to the shaft and the female part including a cylindrical bore and a locking groove formed in the bore so that the locking ring seats in the locking groove and the conductor makes electrical contact with the female part.

16. The switch assembly according to claim 15 wherein the actuator is a magnetic actuator.

17. The switch assembly according to claim 16 wherein the switch assembly is part of a single-phase self-powered magnetically actuated fault interrupting device for use in a medium voltage power distribution network.

* * * * *